Patented Dec. 30, 1952

2,623,871

UNITED STATES PATENT OFFICE 2,623,871

CHROMIUM CONTAINING MONOAZO DYESTUFFS

Guido Schetty and Fabio Beffa, Basel, Switzerland, assignors to J. R. Geigy A. G., Basel, Switzerland, a Swiss firm No Drawing. Application March 16, 1951, Serial No. 216,098. In Switzerland April 27, 1950

7 Claims. (Cl. 260—151)

The present invention concerns the production of new monoazo dyestuffs with a chromium content which are suitable for dyeing natural and artificial protein fibres and fibres related thereto, textiles made up from such fibres, and also leather. In particular, it is concerned with the production of new o.o'-dihydroxyazo dyestuff complex chromium compounds which contain no sulphonic acid groups and which can be dyed from a weakly acid aqueous medium.

It has now been found that monoazo dyestuffs containing no sulphonic acid groups of the general formula:

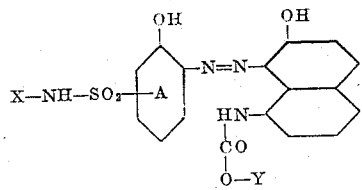

wherein X represents hydrogen or an alkyl radical substituted or unsubstituted, and Y represents a $CH_3$, $C_2H_5$, $C_2H_4OCH_3$ or $C_2H_4OC_2H_5$ radical and wherein the benzene ring A may contain other non-iogenic substituents usual in azo dyestuffs, can be converted into the complex chromium compounds by the usual methods by treatment with agents giving off chromium. These complex compounds are distinguished by their good drawing power from a weakly acid bath on to protein fibres or fibres related thereto and therefore give very even, fast to light grey dyeings, particularly on mixed wool of varied origin.

The chromium-containing dyestuffs according to this invention are obtained from diazotised o-amino phenols, which contain no sulphonic acid groups and which must contain sulphonic acid amide groups of ammonia or of low aliphatic, substituted or unsubstituted primary amines, by coupling with nitrogen carbalkoxy derivatives of 1-amino-7-hydroxynaphthalene which contain no sulphonic acid groups, and treating the o.o'-dihydroxyazo dyestuffs so obtained with agents giving off chromium. The diazotised amino phenols above mentioned may also contain other non-ionogenic substituents usual in azo dyestuffs such as halogen, methyl or nitro groups.

The sulphonic acid amide group of the diazo component must be a hydrophilic sulphonic acid amide group, i. e. it must be derived from primary amines which do not contain a hydrophobic radical. For this reason, only low aliphatic radicals, preferably those with hydrophilic substituents come into question as organic radicals, such as the methyl group, the hydroxyethyl group or the dihydroxypropyl group. However, the sulphonic acid amide group of ammonia —$SO_2$—$NH_2$ is to be preferred to all other sulphonic acid amide groups. 2-hydroxy-1-aminobenzene-5-sulphonic acid amide is the most simple and technically the most accessible of all the diazo components.

According to the definition, the acyl radicals of 1-amino-7-hydroxynaphthalene are carbonic acid half esters of low alcohols and substituted low alcohols; preferably hydrophilic groups such as low alkoxy groups are useful as substituents. 7-hydroxynaphthyl-(1)-methyl- or -ethyl- or -2'-methoxyethyl-, or -2'-ethoxyethyl urethane are particularly advantageous coupling components.

The most advantageous chroming method for the dyestuffs according to this invention is that by which the dyestuff's acylamino group is not affected by the reaction conditions. For instance, chromium acetate may be used, preferably in the presence of solubility promoters like low alcohols or low fatty acid amides. However, treatment of the dyestuffs according to this invention with alkali salts of chromosalicylic acid in an aqueous medium at a raised temperature according to the process described in U. S. P. 2,428,866 is preferable to every other chroming method.

The particular advantage of the new complex chromium dyestuffs lies in the fact that they draw on to wool very well and evenly from a neutral to weakly acid bath and therefore amongst other things, they can also be used for the dyeing of mixed fibres containing cellulose.

The following examples illustrate the invention without restricting it in any way. Where not otherwise stated, parts are given as parts by weight and temperatures are in degrees centigrade. The relationship of parts by weight to parts by volume is that of kilogrammes to litres.

*Example 1*

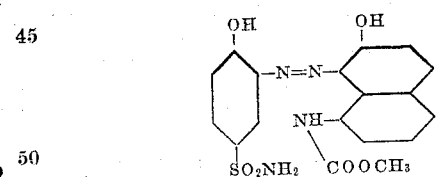

18.8 parts of 2-aminophenol-4-sulphonic acid amide are dissolved in 100 parts of water and 22 parts of conc. hydrochloric acid and then diazotised by the addition of a 33% sodium nitrite solution (corresponding to 6.9 parts of NaNO₂ 100%) at 0–5°, after which it is neutralised with sodium bicarbonate. The diazonium compound suspension is then poured into a solution of 22.8 parts of 1-carbomethoxyamino-7-hydroxynaphthalene in 210 parts of 0.5 n-caustic soda lye and 150 parts by volume of 10% sodium carbonate solution at 0–3°. It is then stirred at 0–3° until the formation of the dyestuff is complete, whereupon it is heated to 70° and the dyestuff is precipitated by the addition of saturated sodium chloride solution and the precipitate filtered off. The dyestuff while still damp is heated to boiling for 3 hours with a reflux condenser in 800 parts of water with 110 parts of a solution of chromosalicylic acid ammonium (corresponding to 4.2 parts Cr₂O₃). A dark blue coloured solution is formed out of which the chromium-containing dyestuff is precipitated by the addition of sodium chloride. After filtering and drying, the dyestuff forms a blue-black powder which dissolves in hot water. It dyes wool in blue-grey shades from a neutral or weakly acid dyebath which have excellent fastness to light properties.

Similar dyestuffs are obtained if 27.4 parts of 7-hydroxynaphthyl-(1)-carbamic acid methoxyethyl ester or 28.9 parts of 7-hydroxynaphthyl-(1)carbamic acid ethoxyethyl ester are used instead of 1-carbomethoxyamino-7-hydroxynaphthalene.

*Example 2*

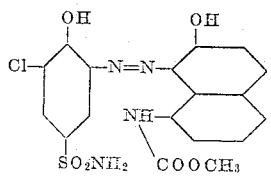

22.3 parts of 6-chloro-2-aminophenol-4-sulphonic acid amide (Chemisches Zentralblatt 1934, II, p. 2905) are stirred into 100 parts of water and 22 parts of conc. hydrochloric acid and then diazotised with a sodium nitrite solution (corresponding to 6.9 parts NaNO₃ 100%) at 3–4°. The suspension is neutralised with sodium carbonate and then poured at 0–5° into a solution of 22.8 parts of 1-carbomethoxyamino-7-hydroxynaphthalene in 300 parts of water, 4.2 parts of sodium hydroxide and 15 parts of sodium carbonate. On completion of the formation of the dyestuff, it is quickly heated to 60° and after the addition of sodium chloride the dyestuff is filtered off. The dyestuff which does not contain chromium is boiled in 800 parts of water with 110 parts of a solution of chromosalicylic acid ammonium (corresponding to 4.2 parts Cr₂O₃) until the complex formation is complete. The dyestuff is isolated by filtration after addition of sodium chloride. After drying, the dyestuff forms a blue-black powder which dyes wool from a neutral bath in grey shades with good fastness properties.

If, instead of 22.3 parts of 6-chloro-2-aminophenol-4-sulphonic acid amide, the same number of parts of either 5-chloro-2-aminophenol-4-sulphonic acid amide, or of 4-chloro-2-aminophenol-5-sulphonic acid amide, or 23.3 parts of 6-nitro-2-aminophenol-4-sulphonic acid amide, or in the latter case, if 24.2 parts of 1-carbethoxyamino-7-hydroxynaphthalene are used as coupling component, similar grey dyestuffs are obtained.

*Example 3*

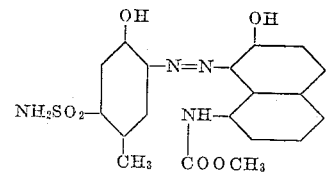

20.2 parts of 4-methyl-2-aminophenol-5-sulphonic acid amide are diazotised in the same way as 2-aminophenol-4-sulphonic acid amide and coupled with 22.8 parts of 1-carbomethoxyamino-7-hydroxynaphthalene as described in Example 2. The dyestuff so obtained in 800 parts of water is heated to boiling for some hours under reflux with 110 parts of a solution of chromosalicylic acid ammonium (corresponding to 4.2 parts of Cr₂O₃). The chrome-containing dyestuff is precipitated by the addition of sodium chloride, filtered and dried. It forms a blue-black powder which dyes wool from a neutral or weakly acid bath in grey shades with very good fastness to wet treatment and light. The dyeings change their shade very little in artificial light.

If 18.8 parts of 2-aminophenol-5-sulphonic acid amide are used instead of 4-methyl-2-amino-phenol-5-sulphonic acid amide or, instead of 1-carbomethoxyamino-7-hydroxynaphthalene, 24.2 parts of 1-carbethoxyamino-7-hydroxynaphthalene are used, a similar dyestuff is obtained.

4 - methyl - 2 - aminophenol - 5 - sulphonic acid amide is produced as follows: 5-methyl-benzoxazolone-(2)- is sulphonated with conc. sulphuric acid into 5-methyl-benzoxazolone-6-sulphonic acid. The sulphonic acid is converted into the corresponding sulphonic acid chloride with phosphopentachloride and this is then converted into 5-methyl-benzoxazolone-6-sulphonic acid amide by stirring with aqueous ammonia. 4-methyl-2-aminophenol-5-sulphonic acid amide is then obtained by heating with dilute caustic soda lye.

2-aminophenol-5-sulphonic acid amide is obtained if benzoxazolone-(2)-is used instead of 5-methylbenzoxazolone-(2)- in the above reaction.

*Example 4*

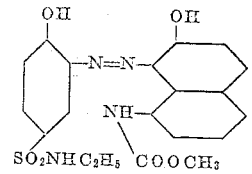

48.2 parts of the monosodium salt of the dyestuff obtained by coupling diazotised 2-aminophenol-4-sulphonic acid ethylamide with 1-carbomethoxyamino-7-hydroxynaphthalene are heated to boiling for some hours under reflux with 110 parts of a solution of chromosalicyclic acid ammonium (corresponding to 4.2 parts Cr₂O₃). The chrome-containing dyestuff precipitates out to a great extent. It is filtered and dried. On mixing with sodium carbonate, trisodium phosphate or a dispersing agent it is sufficiently water soluble. It draws on to wool from a neutral bath in very fast grey shades.

If 49.7 parts of the monosodium salt of the dyestuff obtained by coupling diazotised 2-aminophenol-4-sulphonic acid monoethanol amide with 1-carbomethoxyamino-7-hydroxynaphthalene are used instead of the dyestuff given above, then a chromium-containing dyestuff is obtained which is more soluble but which has less drawing power from a neutral bath.

2-aminophenol-4-sulphonic acid ethylamide is produced as follows: 1-chloro-2-nitrobenzene-4-sulphonic acid chloride is reacted with monoethylamine to 1-chloro-2-nitrobenzene-4-sulphonic acid ethylamide, the chlorine atom is substituted by a hydroxy group by heating with caustic soda lye and the 2-nitrophenol-4-sulphonic acid ethylamide so obtained is reduced in the usual way, e. g. by heating with sodium sulphide solution. If mono-ethanolamine is used in the above process instead of ethylamine, 2-aminophenol-4-sulphonic acid monoethanolamide is obtained.

*Example 5*

10 parts of wool flannel are put into a 40° warm bath consisting of 0.2 part of the dyestuff obtained according to Example 2, 1 part of dehydrated sodium sulphate and 0.25 part of 85% acetic acid in 400 parts of water. The bath is brought to the boil within 30 minutes when 1 part of 10% sulphuric acid is added whereupon the bath is kept at the boil for 1 hour. The wool is then rinsed and dried. The wool, which has been dyed a deep grey, is very fast to light, water and perspiration.

*Example 6*

10 parts of wool are placed in a 40° warm bath consisting of 0.2 part of the dyestuff according to Example 1 in 400 parts of water, to which has been added 1 part of dehydrated sodium sulphate and 0.3 part of ammonium acetate. The bath is then brought to the boil and kept at that temperature until the liquor is practically exhausted, which occurs in about 1 hour. The wool, which is dyed a deep blue-grey, is rinsed and dried. The dyeing is distinguished by its very good fastness to light, washing, milling and perspiration.

Very beautiful blue-grey dyeings are obtained if in place of wool, 10 parts of related synthetic fibres are used such as those prepared from polymerisation products of adipic acid with hexamethylenediamine, from polymerisation products of ε-aminocaprolactam or from polymerisation products of hexamethylenediisocyanate and butylene glycol.

What we claim is:

1. The complex chromium compound of a monoazo dyestuff having the formula:

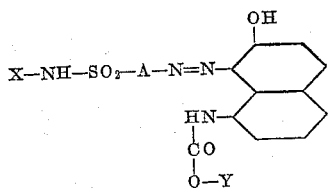

wherein A represents a benzene nucleus containing an OH group in o-position to the azo group, A being otherwise free from carboxylic acid and sulphonic acid groups, X represents a member selected from the group consisting of hydrogen, lower alkyl and lower hydroxyalkyl groups and Y represents a member selected from the group consisting of $CH_3$, $C_2H_5$, $C_2H_4OCH_3$ and $C_2H_4OC_2H_5$.

2. The complex chromium compound of a monoazo dyestuff having the formula:

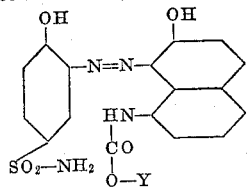

wherein Y represents a member selected from the group consisting of $CH_3$, $C_2H_5$, $C_2H_4OCH_3$, and $C_2H_4OC_2H_5$.

3. The complex chromium compound of a monoazo dyestuff having the formula:

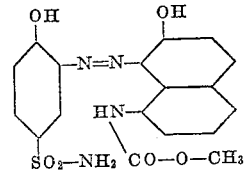

4. The complex chromium compound of a monoazo dyestuff having the formula:

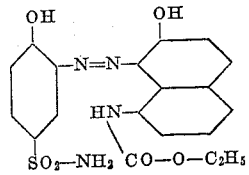

5. The complex chromium compound of a monoazo dyestuff having the formula:

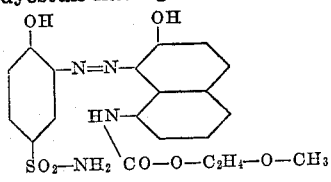

6. The complex chromium compound of a monoazo dyestuff having the formula:

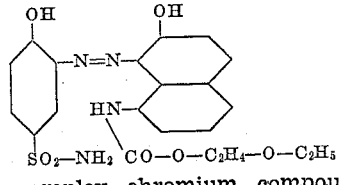

7. The complex chromium compound of a monoazo dyestuff having the formula:

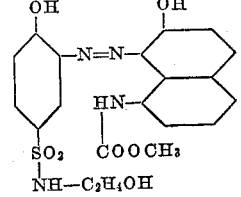

GUIDO SCHETTY.
FABIO BEFFA.

REFERENCES CITED

The following references are of record in the file of this patent:

UNITED STATES PATENTS

| Number | Name | Date |
|---|---|---|
| 2,033,341 | Krzikalla | Mar. 10, 1936 |
| 2,447,163 | Conzetti | Aug. 17, 1948 |
| 2,482,946 | Steinemann | Sept. 27, 1949 |
| 2,499,133 | Conrad | Feb. 28, 1950 |
| 2,543,610 | Steinemann | Feb. 27, 1951 |
| 2,551,056 | Schetty | May 1, 1951 |